United States Patent [19]

Chang

[11] Patent Number: 5,165,084
[45] Date of Patent: Nov. 17, 1992

[54] SYSTEM AND METHOD FOR MEASURING CHANGES IN SEA LEVEL

[75] Inventor: David B. Chang, Tustin, Calif.

[73] Assignee: Hughes Aircraft Company, Los Angeles, Calif.

[21] Appl. No.: 659,761

[22] Filed: Feb. 25, 1991

[51] Int. Cl.⁵ .............................................. G01F 73/26
[52] U.S. Cl. .................................. 361/284; 73/304 C
[58] Field of Search ...................... 361/284; 73/304 C; 324/72; 340/207; 367/12

[56] References Cited

U.S. PATENT DOCUMENTS

| | | | |
|---|---|---|---|
| 2,768,368 | 10/1956 | Crane et al. | 340/207 |
| 2,817,234 | 12/1957 | Campbell | 73/304 |
| 3,873,050 | 3/1975 | Hill | 324/72 X |
| 4,194,395 | 3/1980 | Wood | 73/304 C |
| 5,077,696 | 12/1991 | McEachern et al. | 367/12 |

Primary Examiner—Donald A. Griffin
Attorney, Agent, or Firm—Michael W. Sales; Wanda K. Denson-Low

[57] ABSTRACT

A system for determining changes in sea level based on the measurement of distance between capacitive elements. The system includes an electrically conductive sphere 17, 117 mounted on an electrically non-conductive buoy 13, 113, positioned a predetermined distance above sea level with the sphere and the sea (earth) acting as capacitive elements separated by the predetermined distance. The system also includes an ion source 25 for imparting charge to the sphere 17, a clock 23, an electrometer 21 for detecting (measuring) the voltage on the sphere at selected clock times. In an alternative embodiment, the ion source and electrometer are replaced with a swept frequency voltage generator 121, an inductor 127, and an ammeter 125. The inductor 127 and the sphere 117 form an LC component. In response to voltages of various frequencies applied to the sphere 117 by the generator 121, the ammeter 125 at each clock time, detects (measures) the current at the resonant frequency of the LC component. The measured voltages (or currents) are then averaged over time to compensate for wave motion (bobbing) of the buoy and dimensional changes in the buoy due to thermal (solar) effects. From each averaged voltage (or current) capacitance and sea level are calculated, and the change in sea level noted.

18 Claims, 3 Drawing Sheets

SYSTEM AND METHOD FOR MEASURING CHANGES IN SEA LEVEL

BACKGROUND OF THE INVENTION

This invention relates to the measurement of varying parameters of capacitive elements generally, and particularly to the measurement of changes in sea level upon characterization of the earth as a capacitive element.

Slight changes in sea level (e.g., changes of the order of about 0.6 cm per year) may occur as a result of global warming. However, present satellite measurements of sea level do not reflect such small changes. For example, the GEOS 3 and SEASAT satellites presently measure sea level changes to about 10 cm of accuracy.

Also, satellite launchings are expensive; so are space-approved satellite instrumentation.

What is needed and would be useful, therefore, is a less expensive system which could detect slight sea level changes that may be even less than 10 cm, and provide accurate measurements of such changes.

SUMMARY OF THE INVENTION

The present invention provides a system for determining changes in sea level that is substantially less expensive than satellite systems, and that can detect slight sea level changes which may be less than 10 cm/yr.

According to one aspect of the invention, the system, which is mountable on an electronically non-conductive buoy, includes an electrically-conductive sphere mountable on the buoy at a predetermined distance above the surface of the sea, for forming a capacitive element relative to the sea; an ion source mounted on the buoy proximate to the sphere and above the sea for applying a charge to the sphere; a clock mounted on the buoy above the sea for producing clock signals; and a detector (electrometer), mounted on the buoy above the sea and forming an electrical circuit with the clock, the ion source, the sphere, and the sea, for detecting, at each clock signal, the voltage on the sphere relative to the sea, said voltage being representative of the capacitance of the sphere and representative of the level of the sea.

According to another aspect of the invention, the system, which is mountable on an electronically non-conductive buoy, includes an electrically-conductive sphere mountable on the buoy at a predetermined distance above the surface of the sea, for forming a capacitive element relative to the sea; a clock mounted on the buoy above the sea for producing clock signals; a swept frequency voltage generator mounted on the buoy above the sea for applying voltages of various frequencies to the sphere; an inductor mounted on the buoy above the sea, and coupled to the sphere, forming an LC component with a resonant frequency; and a detector (ammeter) mounted on the buoy above the sea and forming an electrical circuit with the inductor, the voltage generator, the clock, the sphere, and the sea, for detecting, at each clock signal, the current at the resonant frequency, said current being representative of the capacitance of the sphere and representative of the level of the sea.

According to still another aspect of the invention, a method of determining sea level using an electrically non-conductive buoy is provided, including applying a charge to an electrically conductive sphere mounted on the buoy at a predetermined distance above the surface of the sea, the sphere forming a capacitive element relative to the sea; producing a series of clock signals; and detecting, at each clock signal, the voltage on the sphere relative to the sea, the voltage being representative of the capacitance of the sphere and level of the sea.

According to a further aspect of the invention, a method of determining sea level using an electrically non-conductive buoy is provided, including the steps of: mounting an electrically conductive sphere on the buoy at a predetermined distance above the surface of the sea, the sphere forming a capacitive element relative to the sea; coupling an inductive element to the capacitive element, forming an LC component; producing a series of clock signals; applying voltages of various frequencies to the sphere; and detecting, at each clock signal, the current at the resonant frequency of the LC component, the current being representative of the capacitance of the sphere, and representative of the level of the sea.

In the embodiments described above, the detectors (electrometer/ammeter) each includes an averaging circuit for averaging the detected (measured) value (voltage/current) over time (i.e., over the number of clock signals) in order to compensate for factors such as wave motion (bobbing of the buoy) and dimensional changes in the buoy due to thermal (solar) effects.

DESCRIPTION OF THE PREFERRED EMBODIMENT

Figure 1:
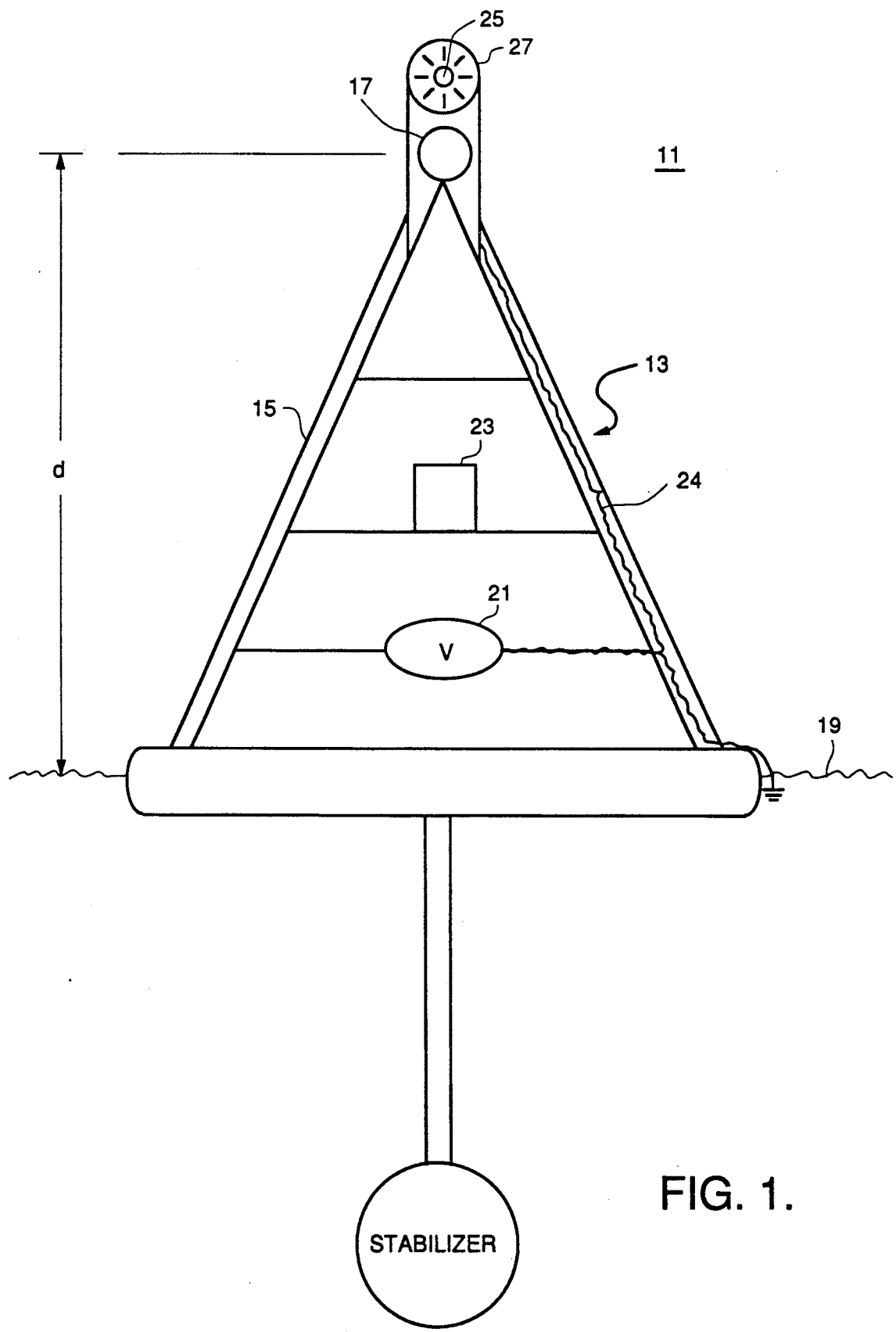
FIG. 1 is a diagrammatic illustration of a system of the present invention mounted on a buoy (an electrically non-conductive floating structure)

Referring now to FIG. 1, there is shown a system 11 of the present invention mounted on a floating marine structure or buoy 13, the buoy having an electrically non-conductive structure 15. The system comprises a electrically conductive sphere 17 (e.g., a stainless steel sphere of radius "a" fixedly mounted to the structure 15, and disposed a predetermined fixed distance "d" from the surface of the sea (earth) 19. The distance "d", which may be fifty meters, for example, is measured from the center of the sphere 17 to the surface of the sea 19. The system 11 includes an electrometer (recording voltmeter) 21, a clock 23 for providing clock (timing) signals, and an ion radiation source 25 (e.g., Carbon 14) with a time-controlled shield 27. The sphere 17, electrometer 21, and clock 23 are conductively coupled by cable 24 and form a circuit, with the sea as electrical ground. The radiation source 25 is used to apply (induce) a charge Q on the sphere 17 at selected times (e.g., every hour) under control of clock 23, and the shield 25 is used to shield the sphere 17 from the source 23. The electrometer 21 is then used to determine, at the selected times (during a predetermined period, e.g., every hour), the change in voltage of the sphere 17 relative to the earth as the charge Q decays. From this change in voltage, the change in capacitance of the sphere relative to the earth is determined. Knowledge of the change in capacitance provides information about the change in sea level, as explained below.

Figure 2:
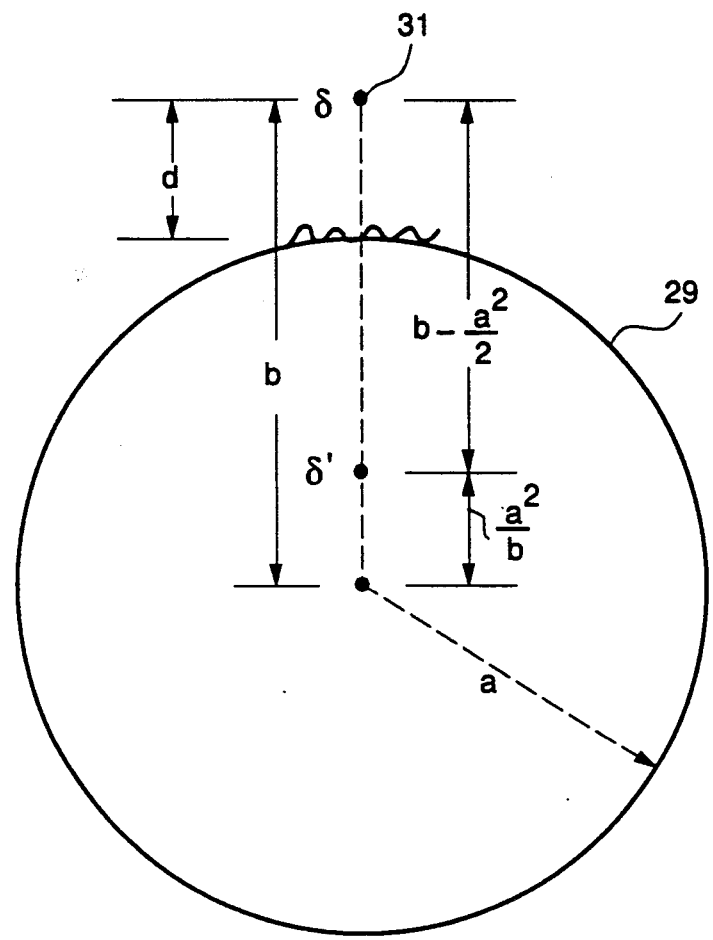
FIG. 2 is a graphic illustration of capacitive elements formed by the earth (and sea) and a conductive sphere mounted on the buoy.

As shown in FIG. 2, the earth may be considered a conductivity globe 29 with radius "a". Then a charge q (e.g., a charge placed on sphere 17 by source 23) located at a distance "b" from the center of the globe may be said to have an associated image charge q'):

$$q' = -\frac{a}{b} q \tag{1}$$

a distance $a^2/b$ from the center of the globe.

In which event, the voltage at the location 31 of the charge (q) may be expressed as:

$$V = \frac{q'}{b - \frac{a^2}{b}} \tag{2}$$

but, since $$q' = -\frac{a}{b} q,$$

then V may be expressed as:

$$V = \frac{aq}{b\left(b - \frac{a^2}{b}\right)} \tag{3}$$

which reduces to $$V = \frac{aq}{b^2 - a^2} \tag{4}$$

but, $b = a + d$ therefore, $V = \frac{aq}{2ad + d^2}$ and, $$\delta v = \frac{\delta a}{a}\left(\frac{qa}{2ad + d^2}\right) - \left(\frac{aq}{2ad + d^2}\right)\left(\frac{2d\delta a}{2ad + d^2}\right)$$

$$\frac{\delta v}{v} = \frac{\delta a}{a} - \frac{2d\delta a}{2ad + d^2}$$

since $d << a$, $\frac{1}{2ad + d^2} \approx \frac{1}{2ad}\left(1 - \frac{d}{2a}\right)$ $$\frac{\delta v}{v} \approx \frac{\delta a}{a} - \frac{\delta a}{a}\left(1 - \frac{d}{2a}\right)$$

therefore, $\frac{\delta v}{v} = \frac{d\delta a}{2a^2} \tag{5}$ which may be rewritten as, $$\frac{\delta v}{v} = \frac{1}{2}\left(\frac{d}{a} \cdot \frac{\delta a}{a}\right) \tag{6}$$

and $\delta c/c$ may be expressed in terms of $\delta v/v$ as follows:

$$\frac{\delta c}{c} = \frac{\delta v}{v} = \frac{1}{2}\left(\frac{d}{a}\right)\left(\frac{\delta a}{a}\right) \tag{7}$$

From the change in capacitance value $\delta c/c$ shown above in equation (7), the difference in radius ($\delta a$), representing a rise or fall in sea level, can then be determined, as follows:

$$\delta a = -\frac{\delta c}{c}\left(\frac{2a^2}{d}\right) \tag{8}$$

For a rise in sea level 0.6 cm (i.e., $\delta a = 0.6$ cm), for example, the value $\delta c/c$ (shown in equation (7) above) would be found to be:

$$\frac{\delta c}{c} = -\frac{1}{2}\left(\frac{5 \times 10^3}{6.437 \times 10^8}\right)\left(\frac{0.6}{6.437 \times 10^8}\right) = -3.6 \times 10^{-15}$$

where
$a = 6.437 \times 10^8$ cm (or 4000 miles)
and $d = 5 \times 10^3$ cm.

Figure 3:
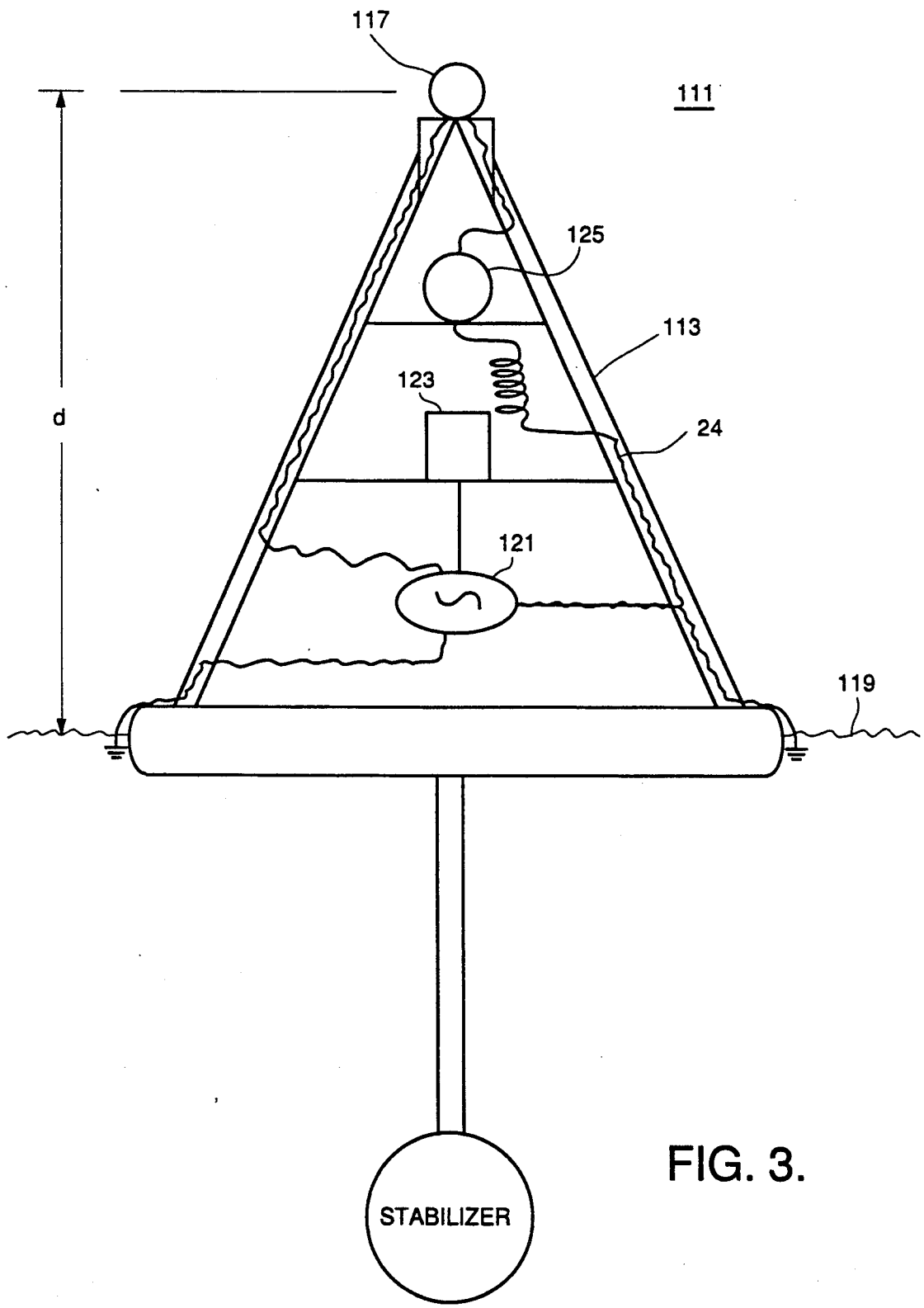
FIG. 3 is a diagrammatic illustration of an alternative embodiment of a system of the present invention.

FIG. 3 shows an alternative embodiment (system 111) of the invention. Like that shown in FIG. 1, the system 111 is fixedly mounted on a non-electrically conductive buoy 113. The system comprises an electrically conductive sphere 117 fixedly mounted to the buoy 113 and disposed a predetermined fixed distance "d" from the surface of the sea 119. The system 111 includes a swept frequency voltage generator 121, a clock 123, a recording ammeter 125 and an inductor 127, conductively coupled to the sphere 117 and forming a circuit with the sea 119.

Figure 4:
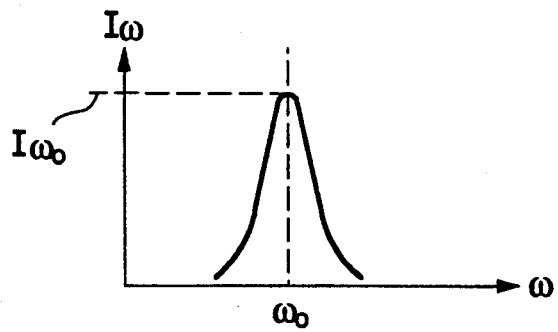
FIG. 4 is a waveform diagram showing a current value (indicative of sea level) detected by the system of FIG. 3.

The sphere 117 and inductor 127 are regarded as elements of an LC circuit, and the capacitance (C) associated with sphere 117 is determined in terms of the resonant angular frequency ($\omega_o$) of the LC circuit, as described below. Under control of clock 123 (i.e., at selected times as determined by the clock), the generator 121 applies voltages of different frequencies ($\omega$) to sphere 117. Ammeter 125 measures the levels of current (I) following in the circuit as a result of the applied voltages, and records the maximum current ($I_\omega$) and the frequency ($\omega_o$) at the maximum current. FIG. 4, which is a graph of current ($I_\omega$) as a function of frequency ($\omega$) shows that the maximum current ($I_\omega$) occurs at the resonant frequency ($\omega_o$) of the LC circuit. With $\omega_o$ known (recorded), the capacitance (c) of the sphere 117 may then be determined (using the known relationship $$\omega_o = \left(\frac{1}{\sqrt{LC}}\right)$$

as follows:

$$c = \frac{1}{L\omega_o^2} \tag{9}$$

By substituting in equation (8) the value for C from equation (9), the difference in radius ($\delta a$), representing a rise or fall in sea level, can then be expressed as:

$$\delta a = -\delta C L \omega_o^2 \left( \frac{2a^2}{d} \right) \quad (10)$$

Moreover, the change $\delta C$ may be expressed in terms of the measured change $\delta \omega_2$ in the resonance frequency by $$\delta C = -\frac{2}{L\omega_o^3} \delta \omega_2 \quad (11)$$

In both embodiments described above, the detectors (the electrometer 21 shown in FIG. 1, and the over time (i.e., over the number of clock signals), in order to compensate for factors such as wave motion and bobbing of the buoy and dimensional changes in the structure of the buoy due to thermal (solar) effects.

While the fundamental features of the invention have been shown and described, it should be understood that various substitutions, modifications, and variations may be made by those skilled in the art without departing from the spirit or scope of the invention. Accordingly, all such modifications and variations are included within the scope of the invention as defined by the following claims.

What is claimed is:

1. A system mountable on an electronically non-conductive buoy for determining sea level, the system comprising:
    a spherical electrically-conductive member mountable on the buoy at a predetermined distance above the surface of the sea, for forming a capacitive element relative to the sea;
    an ion source mounted on the buoy proximate to the spherical member and above the sea for applying a charge to said member;
    a clock means mounted on the buoy above the sea for producing clock signals; and
    a detector means, mounted on the buoy above the sea and forming an electrical circuit with the clock means, the ion source, the spherical member, and the sea, for detecting, at each clock signal, the voltage on said spherical member relative to the sea, said voltage being representative of the capacitance of said spherical member and representative of the level of the sea.

2. The system as in claim 1 wherein the ion source includes a shield responsive to the clock signal for exposing the spherical member to the ion source for a predetermined period of time, then shielding the spherical member from the ion source.

3. The system as in claim 2 wherein said detector means averages the detected voltages over the number of clock signals produced by the clock means.

4. The system as in claim 3 wherein said detector means is a recording electrometer.

5. The system as in claim 4 where the predetermined distance is at least fifty meters.

6. A system for determining sea level comprising:
    an electrically non-conductive buoy for floating in the sea;
    a spherical electrically-conductive member mounted on the buoy and disposed a predetermined distance above the surface of the sea, forming a capacitive element relative to the sea;
    an ion source mounted on the buoy proximate to the spherical member for applying a charge to said member;
    a clock means mounted on the buoy above the sea for producing clock signals; and
    a detector means, mounted on the buoy above the sea and forming an electrical circuit with the clock means, the spherical member, the ion source, and the sea, for detecting, at each clock signal, the voltage on said spherical member relative to the sea, said voltage being representative of the capacitance of said spherical member and representative of the level of the sea.

7. The system as in claim 6 wherein the ion source includes a shield responsive to the clock signal for exposing the spherical member to the ion source for a predetermined period of time, then shielding the spherical member from the ion source.

8. The system as in claim 7 wherein said detector means averages the detected voltages over the number of clock signals produced by the clock means.

9. A system mountable on an electronically non-conductive buoy for determining sea level, the system comprising:
    a spherical electrically-conductive member mountable on the buoy at a predetermined distance above the surface of the sea, for forming a capacitive element relative to the sea;
    a clock means mounted on the buoy above the sea for producing clock signals;
    a voltage generation means mounted on the buoy above the sea for applying voltages of various frequencies to the spherical member;
    an inductor means mounted on the buoy above the sea, and coupled to the spherical member forming an LC component with a resonant frequency; and
    a detector means mounted on the buoy above the sea and forming an electrical circuit with the inductor means, the voltage generation means, the clock means, the spherical member, and the sea, for detecting, at each clock signal, the current at the resonant frequency, said current being representative of the capacitance of said spherical member and representative of the level of the sea.

10. The system as in claim 9 wherein said detector means averages said detected currents over the number of clock signals produced by the clock means.

11. The system as in claim 10 wherein said detector means is a recording ammeter.

12. The system as in claim 11 wherein said voltage generation means is a swept frequency voltage generator.

13. A system for determining sea level, the system comprising:
    an electrically non-conductive buoy for floating in a sea;
    a spherical electrically-conductive member mounted on the buoy and disposed a predetermined distance above the surface of the sea, forming a capacitive element relative to the sea;
    a clock means mounted on the buoy above the sea for producing clock signals;
    a voltage generation means mounted on the buoy above the sea for applying voltages of various frequencies to the spherical member;
    an inductor means mounted on the buoy above the sea, and coupled to the spherical member forming an LC component with a resonant frequency; and a detector means mounted on the buoy above the sea and forming an electrical circuit with the inductor means, the voltage generation means, the clock means, the spherical member, and the sea, for detecting, at each clock signal, the current at the resonant frequency, said current being representative of the capacitance of said spherical member and representative of the level of the sea.

14. The system as in claim 13 wherein said detector means averages said detected currents over the number of clock signals produced by the clock means.

15. The system as in claim 14 wherein said detector means is a recording ammeter.

16. The system as in claim 15 wherein said voltage generation means is a swept frequency voltage generator.

17. A method of determining sea level using an electrically non-conductive buoy, the method comprising the steps of:
applying a charge to an electrically conductive sphere mounted on the buoy at a predetermined distance above the surface of the sea, the sphere forming a capacitive element relative to the sea;
producing a series of clock signals; and
detecting, at each clock signal, the voltage on the sphere relative to the sea, said voltage being representative of the capacitance of the sphere and level of the sea.

18. Method of determining sea level using an electrically non-conductive buoy, the method comprising the steps of:
mounting an electrically conductive sphere on the buoy at a predetermined distance above the surface of the sea, the sphere forming a capacitive element relative to the sea;
coupling an inductive element to the capacitive element, forming an LC component;
producing a series of clock signals;
applying voltages of various frequencies to the sphere; and
detecting, at each clock signal, the current at the resonant frequency of the LC component, said current being representative of the capacitance of the sphere, and representative of the level of the sea.

* * * * *